(12) United States Patent
Yeh et al.

(10) Patent No.: US 12,464,666 B2
(45) Date of Patent: Nov. 4, 2025

(54) RETRACTABLE DISPLAY DEVICE

(71) Applicant: SYNCMOLD ENTERPRISE CORP., New Taipei (TW)

(72) Inventors: Chien-Cheng Yeh, New Taipei (TW); Chun-Hao Huang, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 145 days.

(21) Appl. No.: 18/593,340

(22) Filed: Mar. 1, 2024

(65) Prior Publication Data

US 2025/0212344 A1 Jun. 26, 2025

Related U.S. Application Data

(60) Provisional application No. 63/500,303, filed on May 5, 2023.

(30) Foreign Application Priority Data

Dec. 26, 2023 (TW) .................................. 112214187

(51) Int. Cl.
*H05K 5/02* (2006.01)
*F16C 11/04* (2006.01)

(52) U.S. Cl.
CPC ............ *H05K 5/0226* (2013.01); *F16C 11/04* (2013.01); *H05K 5/0217* (2013.01)

(58) Field of Classification Search
CPC .................................................... G06F 3/0412
See application file for complete search history.

(56) References Cited

U.S. PATENT DOCUMENTS

| 2007/0211036 A1* | 9/2007 | Perkins | G06F 3/0412 345/173 |
|---|---|---|---|
| 2016/0165717 A1* | 6/2016 | Lee | H05K 1/028 361/749 |
| 2020/0103476 A1* | 4/2020 | Shin | H05K 1/111 |

\* cited by examiner

*Primary Examiner* — Jerry Wu
(74) *Attorney, Agent, or Firm* — Studebaker Brackett PLLC

(57) ABSTRACT

A retractable display device is provided and includes: a shaft housing; a plate housing assembled with the shaft housing; a mandrel module disposed in the shaft housing; a flexible roller blind wound on the mandrel module; a plurality of main support rods disposed in the plate housing; a plurality of left connecting rod groups respectively arranged between any two of the main support rods; a flexible screen wound on the mandrel module; a first constant torque spring constantly providing a first elastic force and disposed on the mandrel module; and a second constant torque spring constantly providing a second elastic force and disposed on the mandrel module.

18 Claims, 17 Drawing Sheets

RETRACTABLE DISPLAY DEVICE

CROSS-REFERENCE TO RELATED APPLICATION

This application claims the benefit of U.S. Provisional Application Ser. No. 63/500,303 filed on May 5, 2023, and the benefit of Taiwan Patent Application Serial No. 112214187 filed on Dec. 26, 2023. The entirety of each Application is incorporated herein by reference.

BACKGROUND

1. Technical Field

The present disclosure relates to a display device, and more particularly, to a retractable display device that can expand the display area based on needs.

2. Description of Related Art

The retractable display device can expand and store the display retractably to provide the user with more flexibility. However, continuous and repeated bending of this type of retractable display device may cause friction loss between the display and the carrier plate structure, which may reduce the support force of the carrier plate structure or cause the display device to deform, and ultimately the retractable display device cannot be expanded and stored effectively.

SUMMARY

The present disclosure provides a retractable display device, which comprises: a shaft housing extending along a first axis and including a first accommodation space and an elongated opening intercommunicating with the first accommodation space; a plate housing assembled with the shaft housing and including a head plate, a tail plate and a semi-open second accommodation space, wherein the plate housing is able to expand and contract in and out along a second axis that is substantially perpendicular to the first axis, and the plate housing is able to change between a retracted state and an extended state; a mandrel module located in the first accommodation space and including a first shaft and a second shaft extending along the first axis and spaced apart from each other; a flexible roller blind wound around the first shaft in a stretchable and retractable manner; a plurality of main support rods spaced apart from each other in the second accommodation space, wherein each of the main support rods extends substantially parallel to the first axis; a plurality of left connecting rod groups respectively arranged between any two of the main support rods, and respectively including a first left rod and a second left rod, wherein each of the first left rods and each of the second left rods are respectively pivoted on the main support rod, and any two adjacent first left rod and second left rod mesh with each other; a flexible screen wound around the second shaft in a stretchable and retractable manner, and including a main display area, a retracting display area and a connection area connected in sequence, wherein the main display area is fixedly connected to the tail plate, and the connection area is fixedly connected to the second shaft; a first constant torque spring constantly providing a first elastic force and including a first output spool and a first storage spool, wherein the first output spool is provided on the first shaft, the first storage spool is provided on the second shaft, and the first elastic force tends to maintain the plate housing in the retracted state via the flexible screen; and a second constant torque spring constantly providing a second elastic force and including a second output spool and a second storage spool, wherein the second output spool is provided on the second shaft, the second storage spool is provided on the first shaft, and the second elastic force tends to maintain the plate housing in the retracted state via the flexible roller blind; wherein when in the retracted state, each of the first left rods and each of the second left rods are adjacent to each other and substantially parallel to each of the main support rods, the tail plate is located in the head plate, and the retracting display area is retracted in the first accommodation space via the mandrel module, wherein when in the extended state, each of the first left rods and each of the second left rods are obliquely intersecting with each of the main support rods, the tail plate extends from the head plate, and the retracting display area is exposed from the shaft housing.

In the aforementioned retractable display device, the first storage spool is fixedly connected to one end of the second shaft and rotates synchronously with the second shaft, and the second storage spool is fixedly connected to one end of the first shaft and rotates synchronously with the first shaft.

In the aforementioned retractable display device, the first output spool has a first spool body and a first shaft bearing, and the second output spool has a second spool body and a second shaft bearing, wherein the first spool body is sleeved outside the first shaft bearing, and the first shaft is inserted into the first shaft bearing, whereby the first spool body is able to idly rotate relative to the first shaft, wherein the second spool body is sleeved outside the second shaft bearing, and the second shaft is inserted into the second shaft bearing, whereby the second spool body is able to idly rotate relative to the second shaft.

In the aforementioned retractable display device, each of the left connecting rod groups further includes a third left rod and a fourth left rod, each of the third left rods and each of the fourth left rods are respectively pivoted on the main support rod, and any two adjacent third left rod and fourth left rod mesh with each other, wherein when in the retracted state, each of the third left rods and each of the fourth left rods are adjacent to each other and parallel to each of the main support rods, wherein when in the extended state, each of the third left rods and each of the fourth left rods are obliquely intersecting with each of the main support rods, each of the third left rods and each of the first left rods are parallel to each other, and each of the fourth left rods and each of the second left rods are parallel to each other.

In the aforementioned retractable display device, each of the left connecting rod groups further includes a fifth left rod, one end of the fifth left rod is for corresponding two adjacent first left rod and second left rod to be respectively pivoted on, and the other end of the fifth left rod is for corresponding two adjacent third left rod and fourth left rod to be respectively pivoted on, so that each of the fifth left rods is substantially parallel to each of the main support rods, whereby the main support rods, the first left rods, the second left rods, the third left rods, the fourth left rods and the fifth left rods together constitute a plurality of parallelograms connected to each other.

In the aforementioned retractable display device, the retractable display device further comprises a switch module located in the shaft housing and capable of constantly limiting the plate housing to the extended state.

In the aforementioned retractable display device, the switch module includes a main block, at least one groove, at least one stopper and at least one first elastic member, wherein the groove is surrounded and defined by the main block, the stopper is disposed in the groove and is able to move along the first axis relative to the main block, and the first elastic member is accommodated in the groove and abuts against the main block and the stopper.

In the aforementioned retractable display device, the stopper has a first surface and a second surface adjacent to the first surface, wherein the first left rod closest to the mandrel module has a lever portion, and the lever portion is pivotally connected to the main support rod adjacent to the mandrel module, and wherein when the plate housing changes from the retracted state to the extended state, the lever portion abuts against the first surface and pushes the stopper along the first axis and compresses the first elastic member, till the lever portion is separated from the first surface, and the first elastic member rebounds to reset the stopper, thereby causing the lever portion to abut against the second surface and be limited by the second surface.

In the aforementioned retractable display device, the switch module further includes at least one second elastic member, and the second elastic member is provided between the main block and the shaft housing, wherein when the plate housing changes from the extended state to the retracted state, the lever portion pushes the main block along the second axis via the second surface and compresses the second elastic member, till the lever portion is separated from the second surface, and the second elastic member rebounds to reset the main block.

In the aforementioned retractable display device, the switch module further includes a sliding block and a third elastic member, the sliding block has two protruding portions, the third elastic member is provided between the sliding block and the shaft housing, and the main block has two protruding blocks, wherein the main block is not able to move along the second axis when the protruding portions abut against the protruding blocks, and the main block is able to move along the second axis when the sliding block moves along the first axis and compresses the third elastic member so that the protruding portions and the protruding blocks are misaligned relatively, and wherein the third elastic member rebounds to cause the protruding portions to abut against the protruding blocks when the main block is reset via the second elastic member.

In the aforementioned retractable display device, the plate housing further includes at least one middle plate located between the head plate and the tail plate, wherein when in the retracted state, the middle plate is located in the head plate, and the tail plate is located in the middle plate, so the second accommodation space is surrounded and defined by the tail plate at this time, wherein when in the extended state, the middle plate extends from the head plate, and the tail plate extends from the middle plate, so the head plate, the middle plate and the tail plate collectively surround and define the second accommodation space at this time.

In the aforementioned retractable display device, the retractable display device further comprises a plurality of right connecting rod groups respectively arranged between any two main support rods and spaced apart from the left connecting rod groups, wherein each of the right connecting rod groups includes a first right rod and a second right rod, each of the first right rods and each of the second right rods are respectively pivoted on the main support rod, and any two adjacent first right rod and second right rod mesh with each other, wherein when in the retracted state, each of the first right rods and each of the second right rods are adjacent to each other and parallel to each of the main support rods, and wherein when in the extended state, each of the first right rods and each of the second right rods are obliquely intersecting with each of the main support rods.

In the aforementioned retractable display device, each of the right connecting rod groups further includes a third right rod and a fourth right rod, each of the third right rods and each of the fourth right rods are respectively pivoted on the main support rod, and any two adjacent third right rod and fourth right rod mesh with each other, wherein when in the retracted state, each of the third right rods and each of the fourth right rods are adjacent to each other and parallel to each of the main support rods, and wherein when in the extended state, each of the third right rods and each of the fourth right rods are obliquely intersecting with each of the main support rods, each of the third right rods and each of the first right rods are parallel to each other, and each of the fourth right rods and each of the second right rods are parallel to each other.

In the aforementioned retractable display device, each of the right connecting rod groups further includes a fifth right rod, one end of the fifth right rod is for corresponding two adjacent first right rod and second right rod to be respectively pivoted on, and the other end of the fifth right rod is for corresponding two adjacent third right rod and fourth right rod to be respectively pivoted on, so that each of the fifth right rods is substantially parallel to each of the main support rods, whereby the main support rods, the first right rods, the second right rods, the third right rods, the fourth right rods and the fifth right rods together constitute a plurality of parallelograms connected to each other.

In the aforementioned retractable display device, the first constant torque spring further includes a first connecting portion, and the second constant torque spring further includes a second connecting portion, and wherein the first connecting portion is connected to the same side or different sides of the first output spool and the first storage spool, and the second connecting portion is connected to the same side or different sides of the second output spool and the second storage spool.

In the aforementioned retractable display device, a tooth portion is respectively provided at opposite ends of any two adjacent first left rod and second left rod, at opposite ends of any two adjacent third left rod and fourth left rod, at opposite ends of any two adjacent first right rod and second right rod, and at opposite ends of any two adjacent third right rod and fourth right rod, so that the first left rod and the second left rod, the third left rod and the fourth left rod, the first right rod and the second right rod, the third right rod and the fourth right rod are able to mesh with each other via the corresponding tooth portions, and are able to reverse synchronously when changing between the retracted state and the extended state.

In the aforementioned retractable display device, the retractable display device further comprises at least one telescopic track unit disposed on the plate housing and correspondingly located on one side of the flexible screen, wherein when in the extended state, the telescopic track unit is unfolded and supports the flexible roller blind and the flexible screen together with the main support rods, the left connecting rod groups and the right connecting rod groups.

In the aforementioned retractable display device, the retractable display device further comprises a plurality of magnetic components provided on the telescopic track unit and the main support rods for magnetically attracting and attaching the flexible screen or the flexible roller blind.

To sum up, in the retractable display device of the present disclosure, via the arrangement of the first and second shafts with different axes and the first and second constant torque springs, it can achieve the function in that when the first shaft and the second shaft rotate forward/reversely, the first constant torque spring and the second constant torque spring can be respectively wound at one end of the first shaft and the second shaft, and the first constant torque spring and the second constant torque spring can be released at the other end of the first shaft and the second shaft, so as to effectively provide constant torque. In addition, the main support rods, the left connecting rod groups and the right connecting rod groups can be opened and closed synchronously, so that the opening and closing angles are consistent and can be stretched evenly and stably, effectively supporting the flexible screen, so as to have the advantages of small storage space and large expansion support surface.

DETAILED DESCRIPTION

Figure 1:
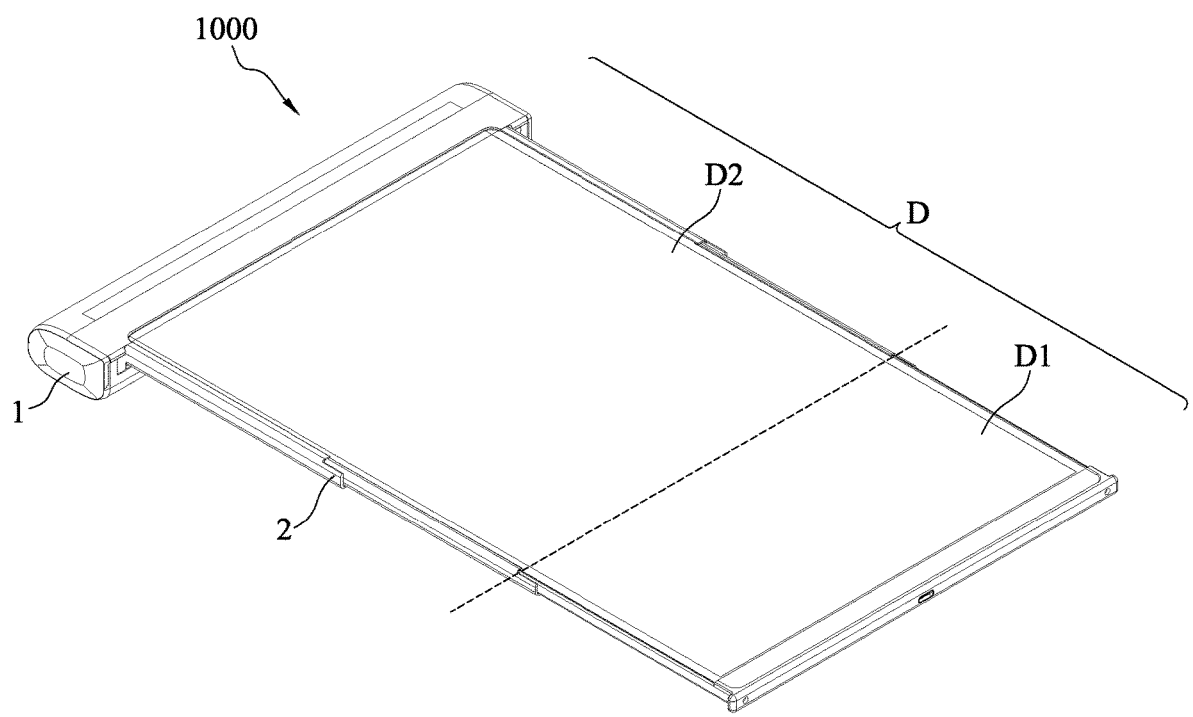
FIG. 1 is an overall schematic view of a retractable display device according to the present disclosure in an extended state.
Figure 2:
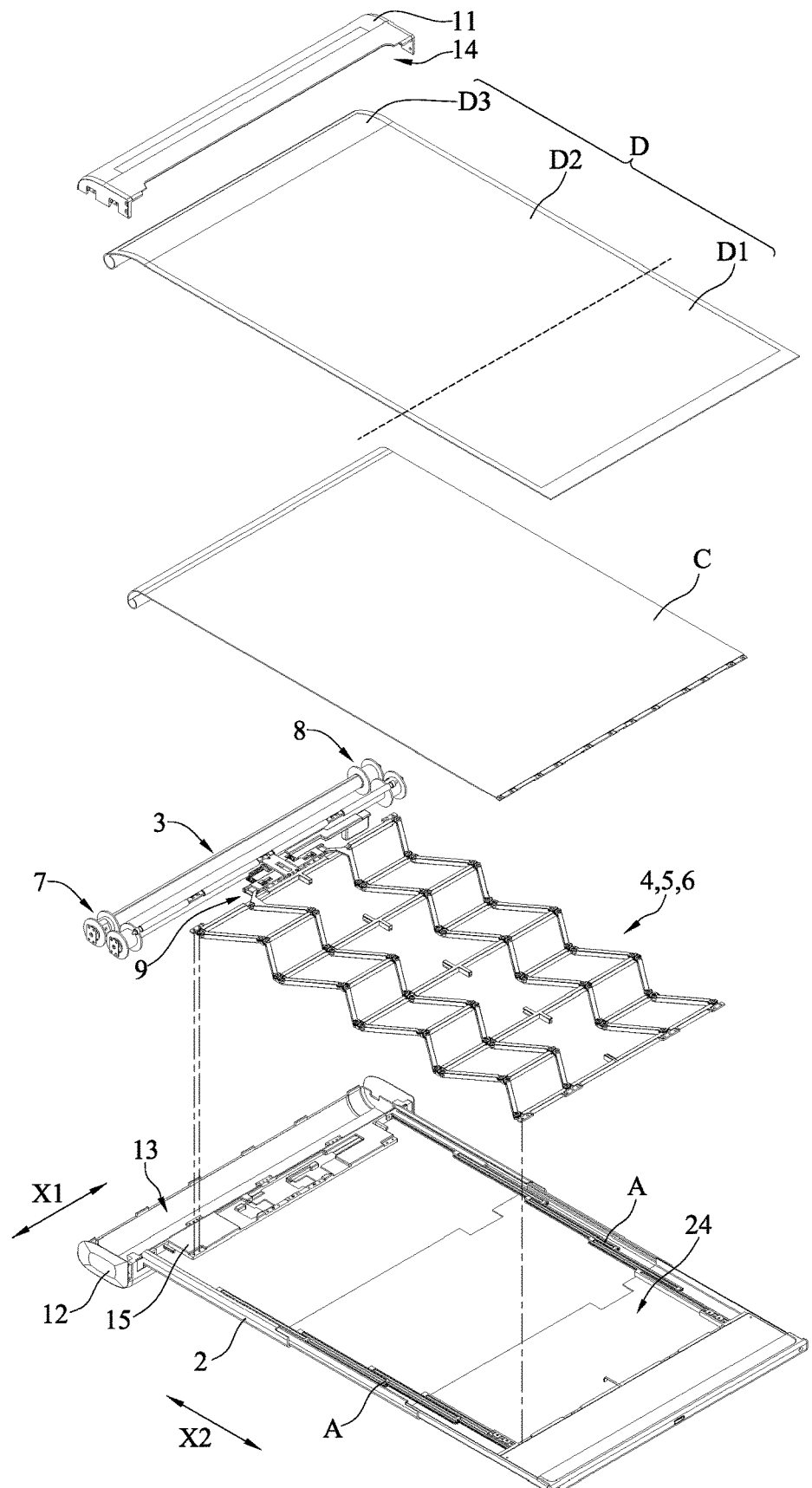
FIG. 2 is an exploded schematic view of the retractable display device according to the present disclosure in an extended state.
Figure 3:
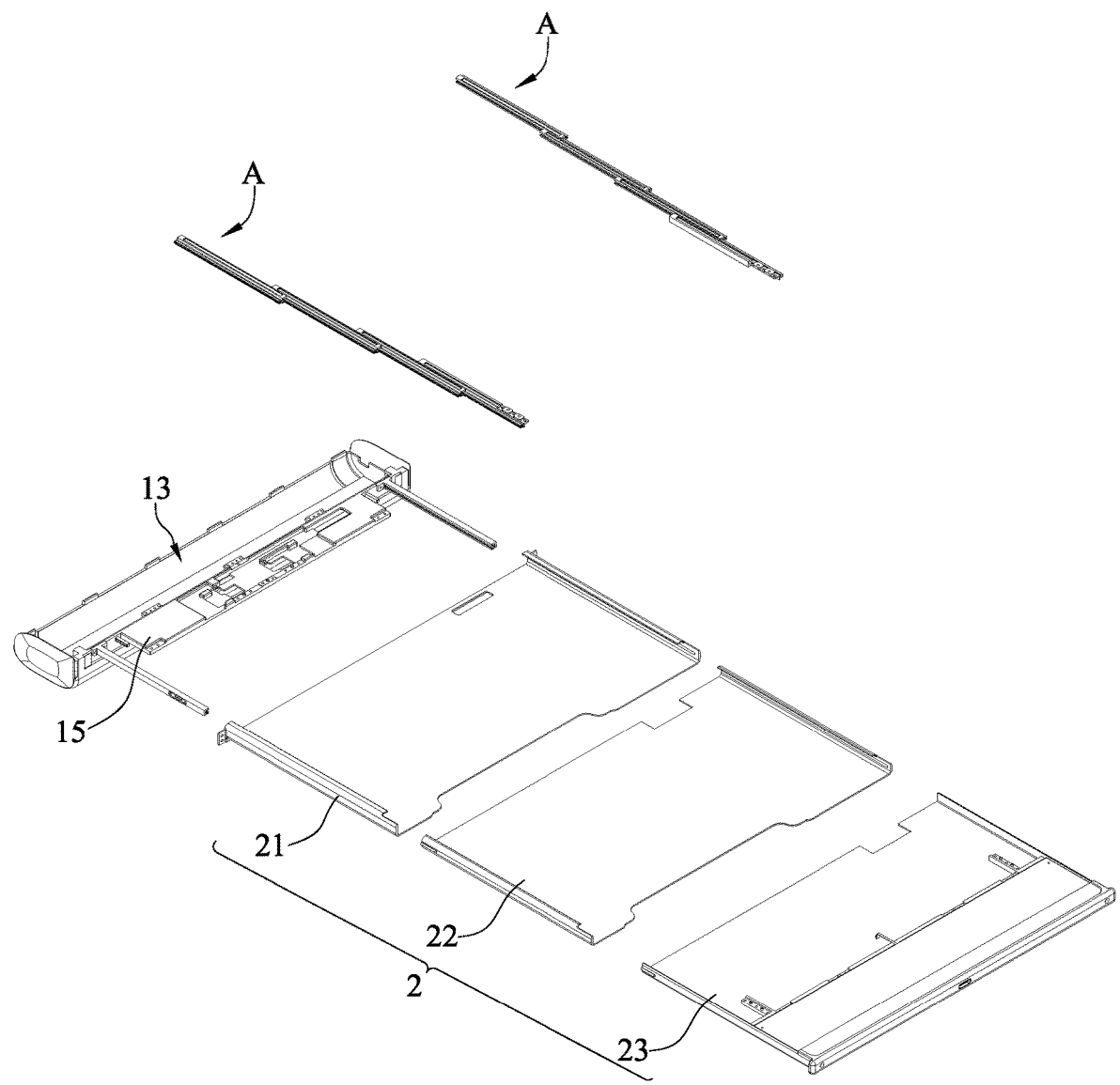
FIG. 3 is an exploded schematic view of some elements of the retractable display device according to the present disclosure.

Please refer to FIG. 1, FIG. 2 and FIG. 3. A retractable display device 1000 of the present disclosure comprises a shaft housing 1, a plate housing 2, a mandrel module 3, five main support rods 4, four left connecting rod groups 5, four right connecting rod groups 6, a first constant torque spring 7, a second constant torque spring 8, a switch module 9, two telescopic track units A, a plurality of magnetic components B (FIG. 7 and FIG. 13), a flexible roller blind C and a flexible screen D, wherein the shaft housing 1 and the plate housing 2 are assembled with each other, the mandrel module 3 is located in the shaft housing 1, the main support rods 4 are located in the plate housing 2, the left connecting rod groups 5 are respectively provided between any two of the main support rods 4 and are located on one side of the main support rods 4, the right connecting rod groups 6 are respectively provided between any two of the main support rods 4 and are located on the other side of the main support rods 4, the first constant torque spring 7 and the second constant torque spring 8 are provided on the mandrel module 3, the switch module 9 is located in the shaft housing 1, the telescopic track units A are provided in the plate housing 2, the magnetic components B are provided on the telescopic track units A and the main support rods 4, the flexible roller blind C is wound on the mandrel module 3, the flexible screen D is wound on the mandrel module 3, and wherein some of the drawings illustrate a first axis X1 and a second axis X2, and the first axis X1 is substantially perpendicular to the second axis X2.

The shaft housing 1 includes an upper cover 11, a lower cover 12, a first accommodation space 13, an elongated opening 14 and an extension plate 15. The upper cover 11 and the lower cover 12 both extend along the first axis X1 and can be assembled with each other to surround and define the first accommodation space 13. The elongated opening 14 is provided on one side of the upper cover 11 and intercommunicates with the first accommodation space 13. The extension plate 15 extends outward from one side of the lower cover 12 along the second axis X2 and is adjacent to the elongated opening 14.

The plate housing 2 includes a head plate 21, a middle plate 22, a tail plate 23 and a second accommodation space 24. The head plate 21, the middle plate 22 and the tail plate 23 are all roughly rectangular and have a U-shaped cross-section. The head plate 21 is fixed to the lower cover 12 and adjacent to the elongated opening 14. The middle plate 22 is roughly slightly smaller than the head plate 21, and is assembled with the head plate 21 slidingly along the second axis X2. The tail plate 23 is also roughly slightly smaller than the middle plate 22, and is assembled with the middle plate 22 slidingly along the second axis X2. That is to say, the middle plate 22 can expand and contract inward and outward along the second axis X2 relative to the head plate 21, and the tail plate 23 can expand and contract inward and outward along the second axis X2 relative to the middle plate 22. The plate housing 2 can change between a retracted state and an extended state, wherein the retracted state means that the middle plate 22 is located within the head plate 21, and the tail plate 23 is located within the middle plate 22, while the extended state means that the middle plate 22 extends out from the head plate 21, and the tail plate 23 extends out from the middle plate 22. The second accommodation space 24 is semi-open, with the smallest volume in the retracted state (roughly surrounded and defined by the tail plate 23) and the largest volume in the extended state (roughly surrounded and defined by the head plate 21, the middle plate 22 and the tail plate 23).

Figure 4:
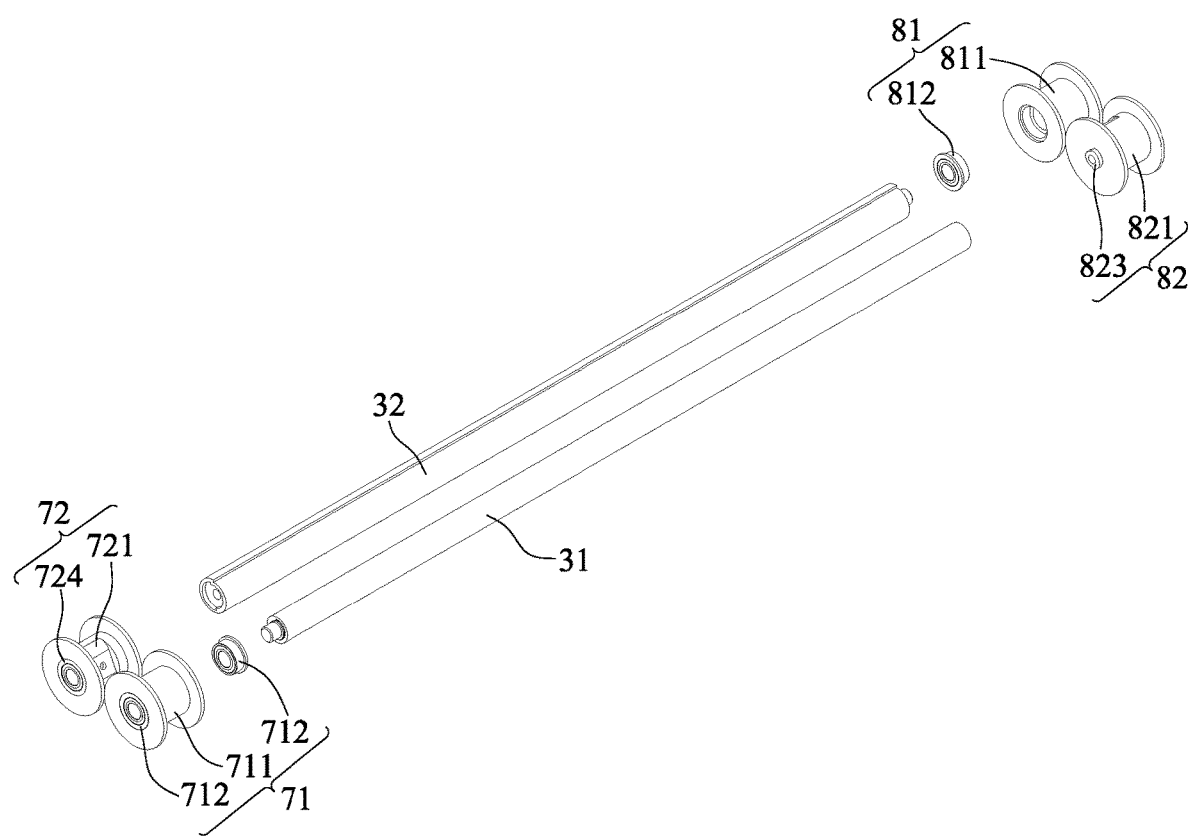
FIG. 4 and FIG. 5 are exploded schematic views of a mandrel module, a first constant torque spring and a second constant torque spring of the retractable display device according to the present disclosure from different perspectives.
Figure 5:
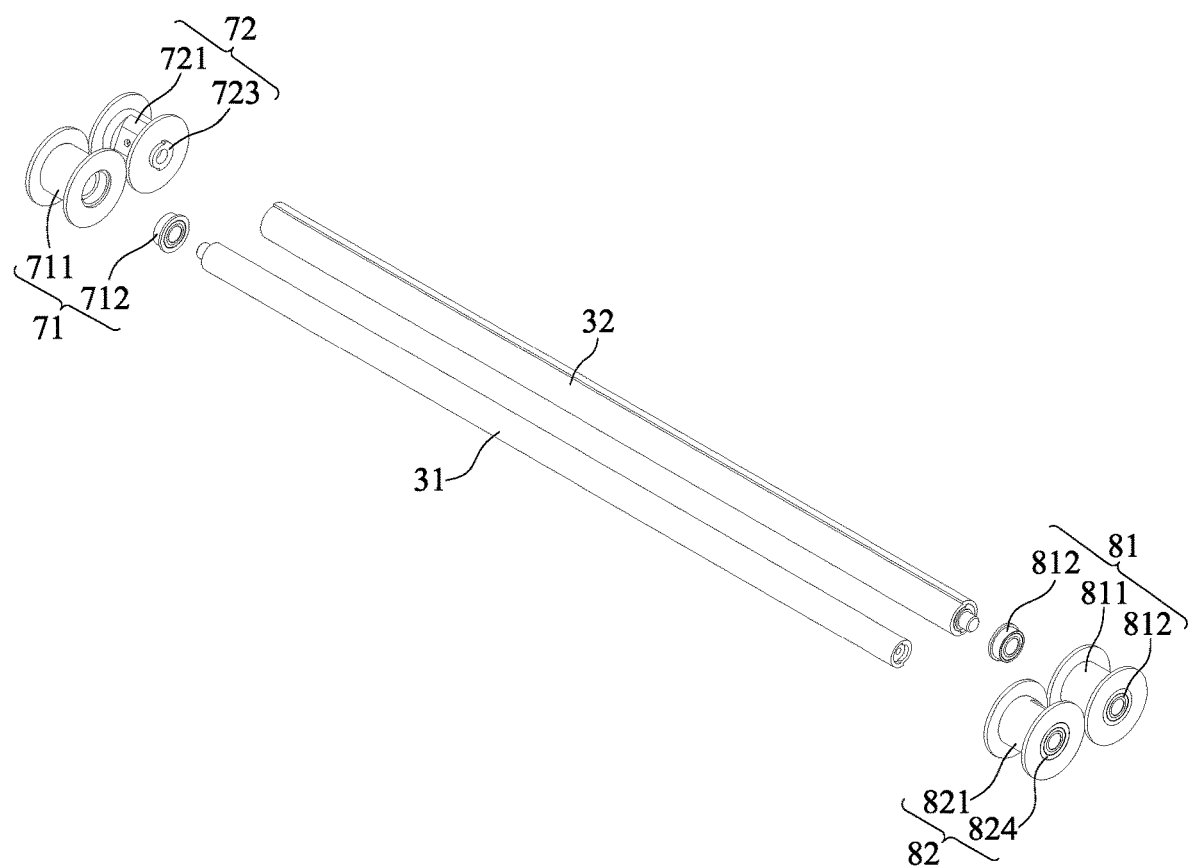

Please refer to FIG. 4 and FIG. 5 at the same time. The mandrel module 3 is located in the first accommodation space 13 and includes a first shaft 31 and a second shaft 32. The first shaft 31 extends along the first axis X1 and is adjacent to the elongated opening 14, and the second shaft 32 extends along the first axis X1 and is spaced apart from the first shaft 31 but away from the elongated opening 14.

Figure 6:
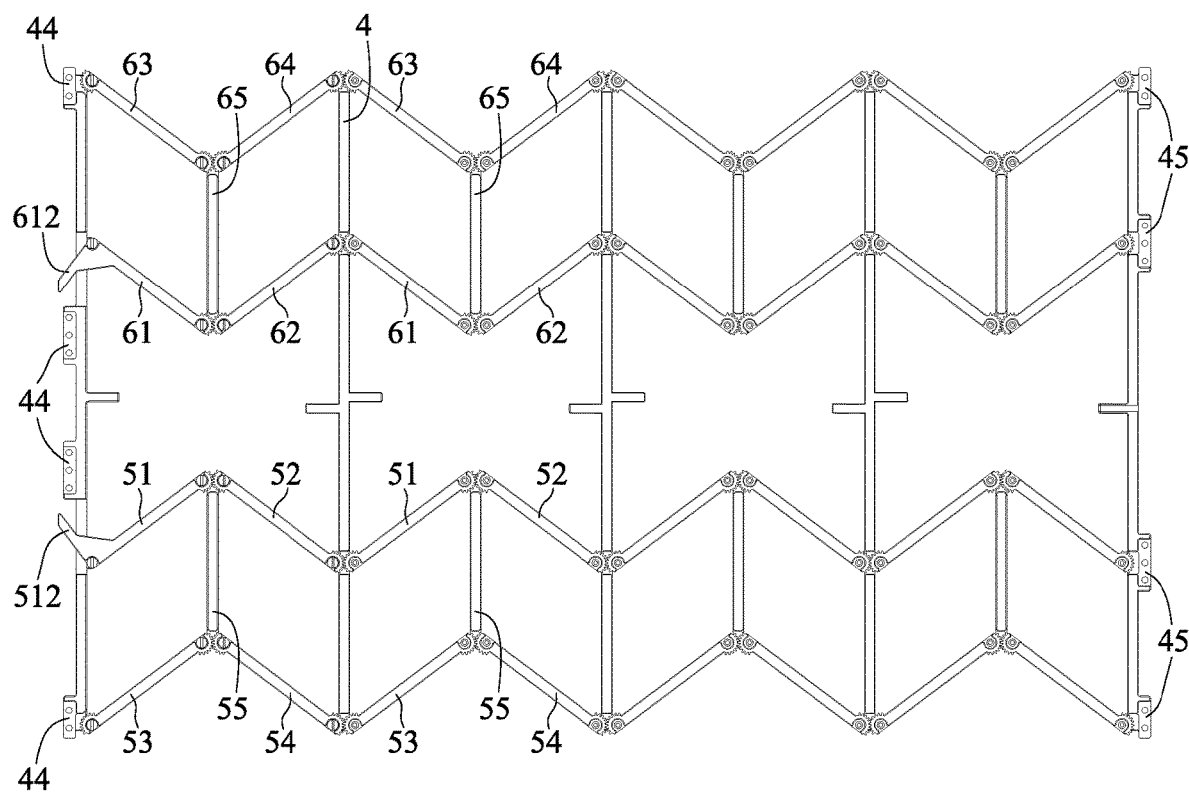
FIG. 6 is a top view of main support rods, left connecting rod groups and right connecting rod groups of the retractable display device according to the present disclosure in an extended state.
Figure 7:
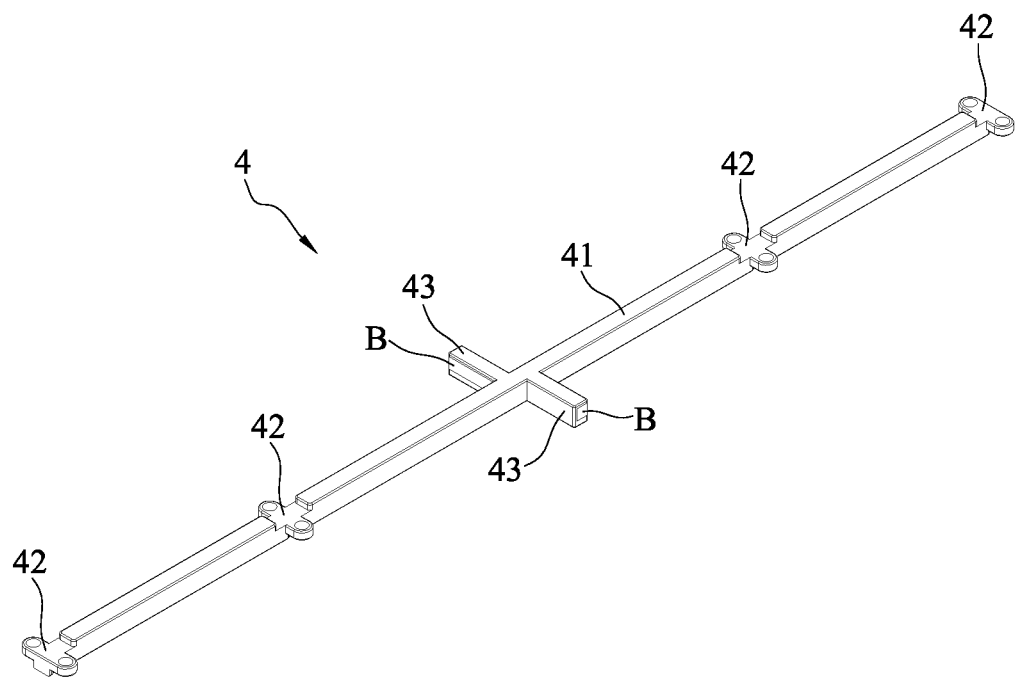
FIG. 7 is an overall schematic view of the main support rod of the retractable display device according to the present disclosure.

Please refer to FIG. 6 and FIG. 7 at the same time. The main support rods 4 are spaced apart from each other in the second accommodation space 24, and each of the main support rods 4 has a rod body 41, four pivot portions 42 and an accommodating portion 43, wherein the rod body 41 extends substantially parallel to the first axis X1. The pivot portions 42 are spaced apart from each other on the rod body 41. The accommodating portion 43 is provided at the center of the rod body 41 and extends outward along the parallel second axis X2. The main support rod 4 closest to the mandrel module 3 also has four fixed portions 44 spaced apart from each other and fixedly connected to the extension plate 15, and the main support rod 4 farthest from the mandrel module 3 also has four fixed portions 45 spaced apart from each other and fixedly connected to the tail plate 23. Thereby, when the plate housing 2 changes between the retracted state and the extended state, the main support rods 4 can also be adjacent to each other (retracted state) or away from each other (extended state).

Figure 8:
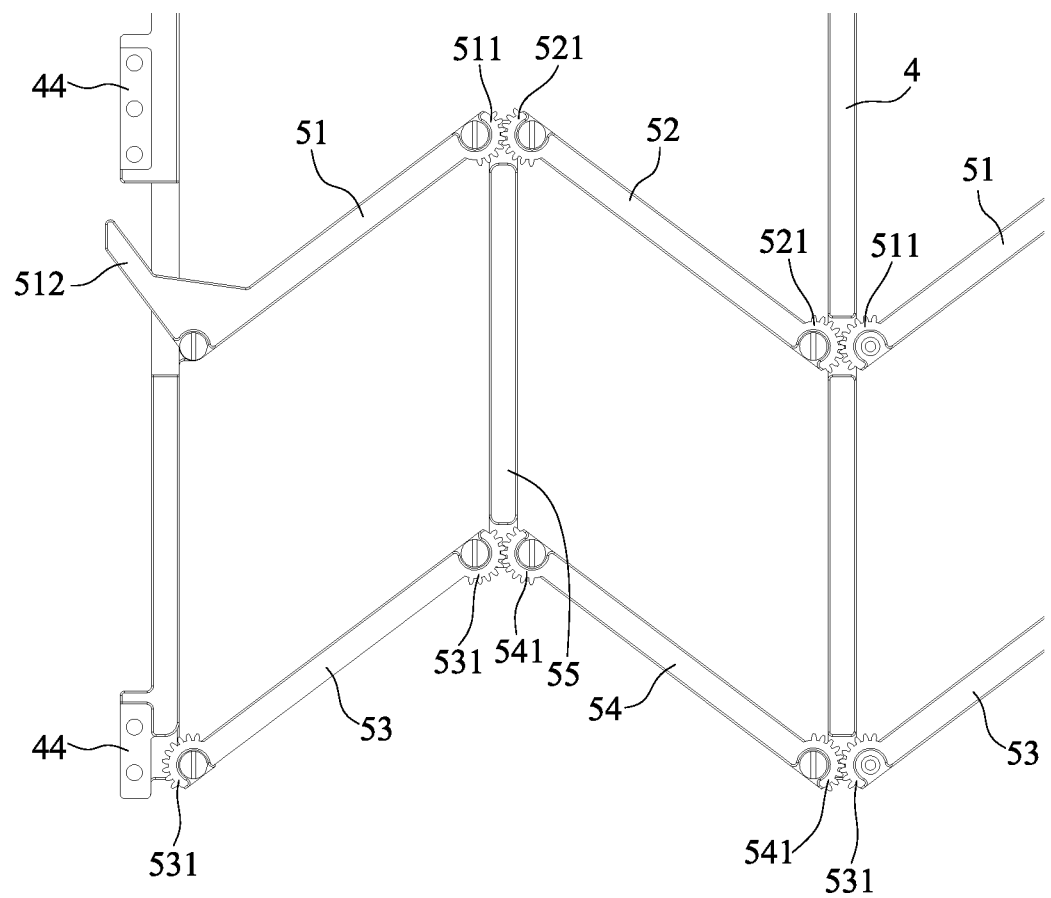
FIG. 8 is an overall schematic view of the left connecting rod group of the retractable display device according to the present disclosure.

Please also refer to FIG. 8. Each of the left connecting rod groups 5 includes a first left rod 51, a second left rod 52, a third left rod 53, a fourth left rod 54 and a fifth left rod 55. The first left rod 51 closest to the mandrel module 3 has a tooth portion 511 (half gear) and a lever portion 512 at opposite ends respectively, and each of the remaining first left rods 51 has a tooth portion 511 at opposite ends respectively. One end of the first left rod 51 is pivoted on the pivot portion 42 of the main support rod 4 (the lever portion 512 is pivotally connected to the pivot portion 42 of the main support rod 4 closest to the mandrel module 3), and the other end of the first left rod 51 is pivoted on one end of the fifth left rod 55. The second left rod 52 has a tooth portion 521 at opposite ends respectively. One end of the second left rod 52 is pivoted on the pivot portion 42 of the main support rod 4, and the other end of the second left rod 52 is pivoted on the one end of the fifth left rod 55. Thereby, the tooth portion 511 and the tooth portion 521 mesh with each other. That is, any two adjacent first left rod 51 and second left rod 52 are meshed with each other in an alternating manner with the pivot portion 42 and the fifth left rod 55 respectively, whereby the first left rod 51 and the second left rod 52 can move synchronously and rotate in opposite directions synchronously. The third left rod 53 has a tooth portion 531 at opposite ends respectively. One end of the third left rod 53 is pivoted on the pivot portion 42 of the main support rod 4, and the other end of the third left rod 53 is pivoted on the other end of the fifth left rod 55. The fourth left rod 54 has a tooth portion 541 at opposite ends respectively. One end of the fourth left rod 54 is pivoted on the pivot portion 42 of the main support rod 4, and the other end of the fourth left rod 54 is pivoted on the other end of the fifth left rod 55, whereby the tooth portion 531 and the tooth portion 541 mesh with each other. That is, any two adjacent third left rod 53 and fourth left rod 54 are meshed with each other in an alternating manner with the pivot portion 42 and the fifth left rod 55 respectively, whereby the third left rod 53 and the fourth left rod 54 can move synchronously and rotate in opposite directions synchronously. The fifth left rod 55 is substantially parallel to the main support rod 4, and its length is approximately equal to the distance between the pivot portions 42 on which the first left rod 51 and the third left rod 53 are respectively pivoted, or equal to the distance between the pivot portions 42 on which the second left rod 52 and the fourth left rod 54 are respectively pivoted, whereby the main support rods 4, the first left rods 51, the second left rods 52, the third left rods 53, the fourth left rods 54 and the fifth left rods 55 together constitute a plurality of parallelograms connected to each other (except for the retracted state).

Figure 9:
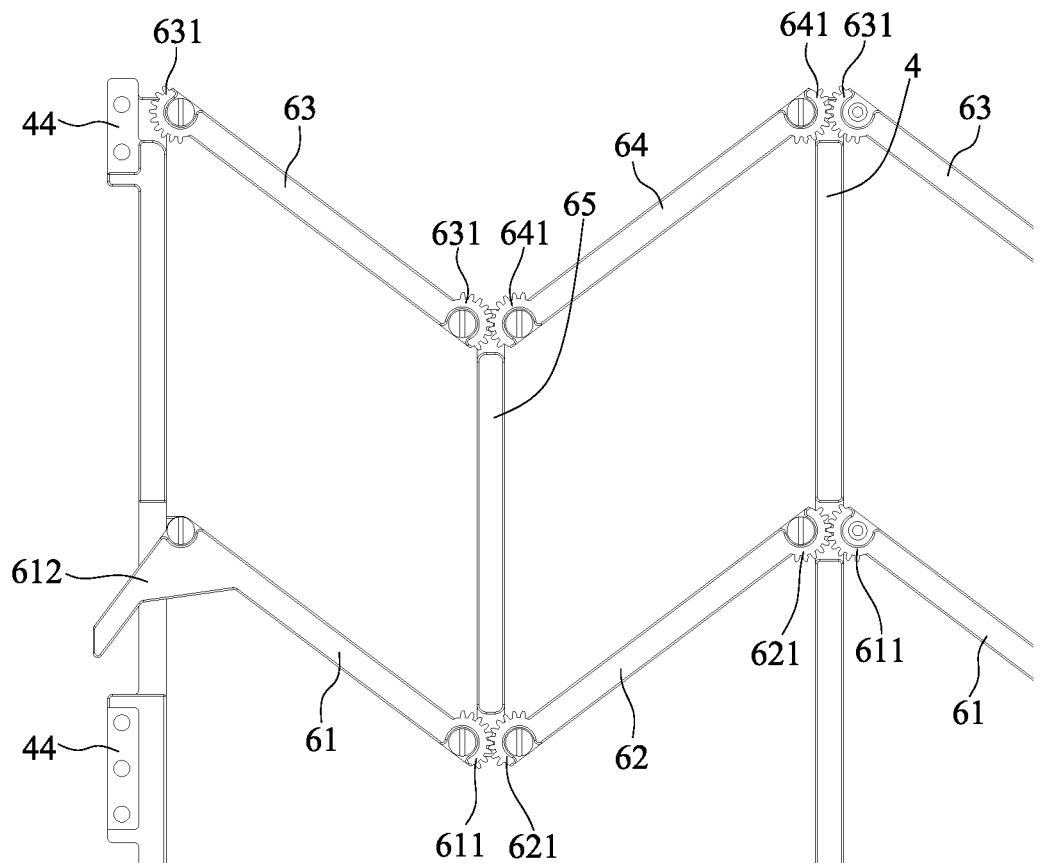
FIG. 9 is an overall schematic view of the right connecting rod group of the retractable display device according to the present disclosure.

Please also refer to FIG. 9. Each of the right connecting rod groups 6 is spaced apart from each of the left connecting rod groups 5 and includes a first right rod 61, a second right rod 62, a third right rod 63, a fourth right rod 64 and a fifth right rod 65. The first right rod 61 closest to the mandrel module 3 has a tooth portion 611 and a lever portion 612 at opposite ends respectively, and each of the remaining first right rods 61 has a tooth portion 611 at opposite ends respectively. Each of the second right rods 62 has a tooth portion 621 at opposite ends respectively, each of the third right rods 63 has a tooth portion 631 at opposite ends respectively, and each of the fourth right rods 64 has a tooth portion 641 at opposite ends respectively. Since the right connecting rod group 6 and the left connecting rod group 5 are arranged symmetrically, their connection relationship and actuation mode are similar, and will not be described again.

Figure 10:
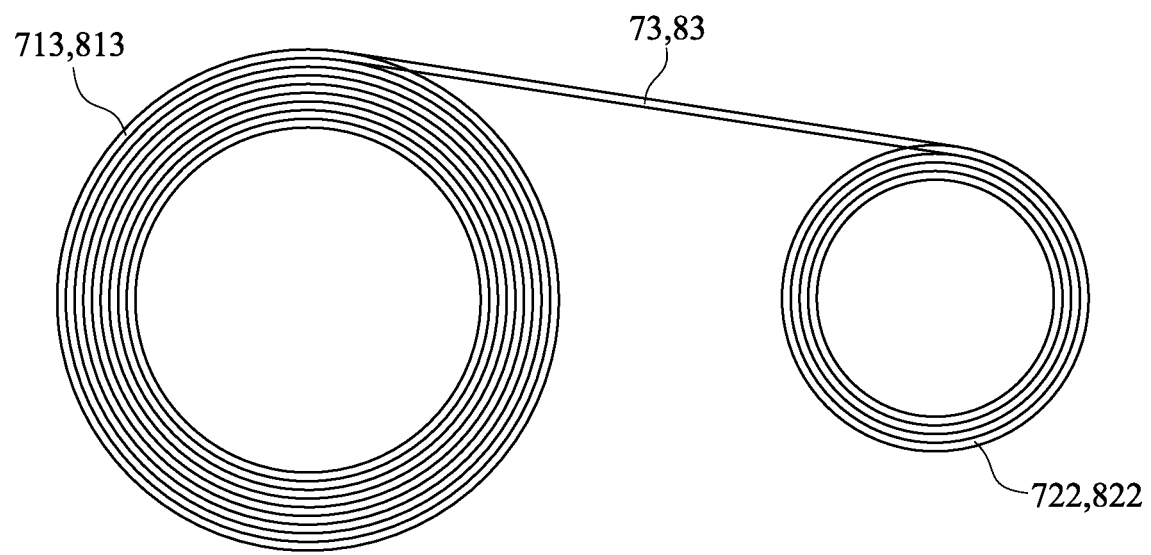
FIG. 10 and FIG. 11 are schematic views of some elements of the first constant torque spring/second constant torque spring in the retractable display device according to different embodiments of the present disclosure.
Figure 11:
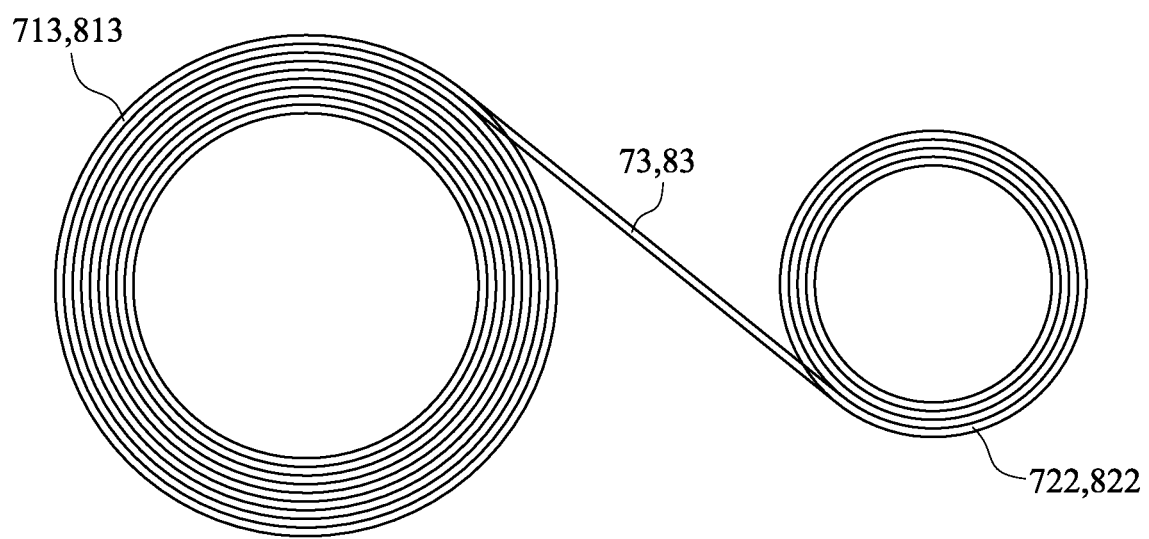
Figure 13:
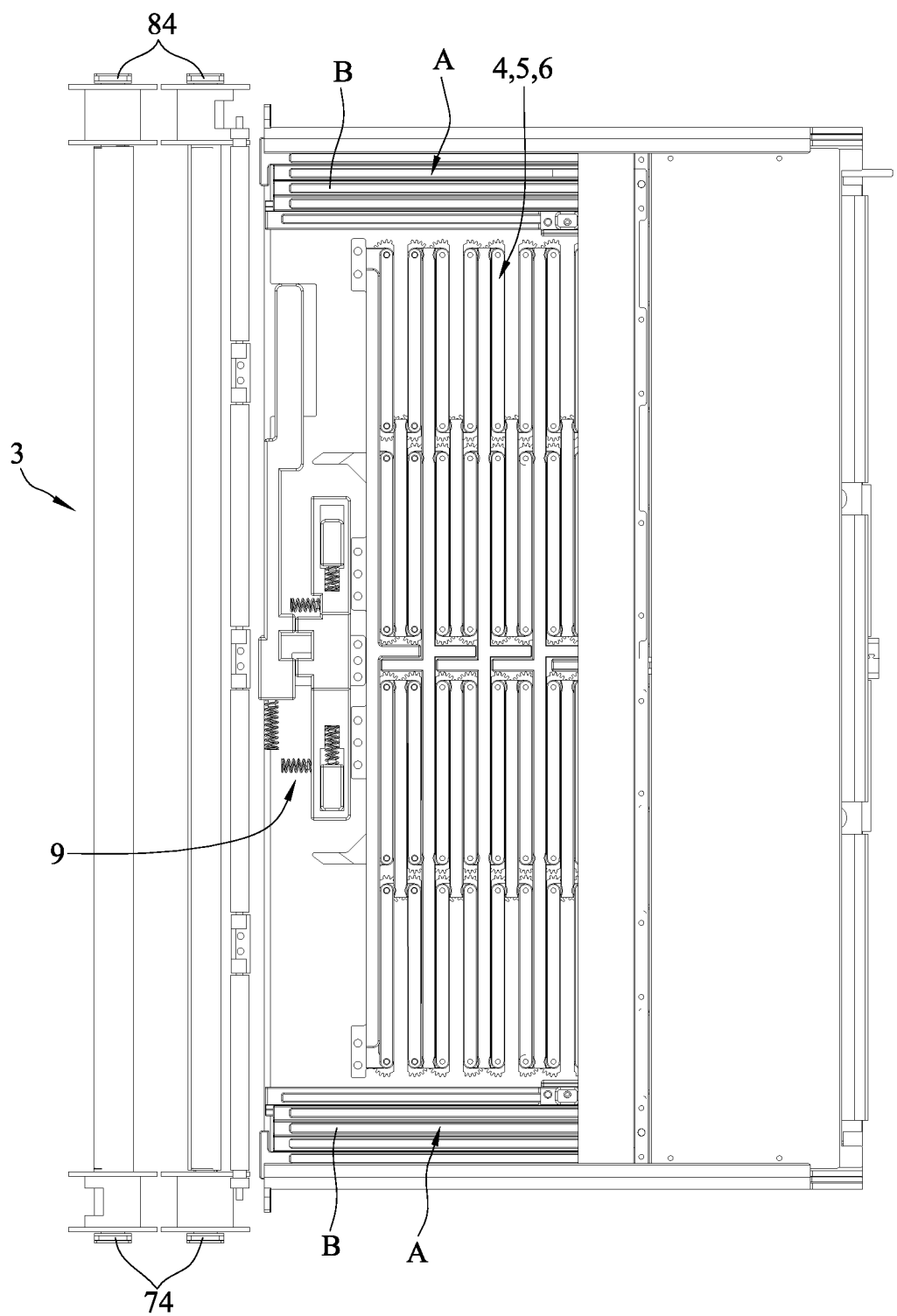
FIG. 13 is a schematic view of the retractable display device according to the present disclosure in a retracted state.

Please refer to FIG. 4, FIG. 5 and FIG. 10 at the same time. The first constant torque spring 7 constantly provides a first elastic force and includes a first output spool 71, a first storage spool 72, a first connecting portion 73 and two first fixing members 74 (FIG. 13). The first output spool 71 has a first spool body 711, two first shaft bearings 712 and a first winding body 713. The first spool body 711 is roughly an H-shaped cylinder and is sleeved outside the first shaft bearings 712. One of the first shaft bearings 712 is inserted into one end of the first shaft 31, and the other one of the first shaft bearings 712 is fixedly connected to one of the first fixing members 74, whereby the first spool body 711 can idly rotate relative to the first shaft 31. The first winding body 713 is wound around the outside of the first spool body 711. The first storage spool 72 has a first spool member 721, a first winding member 722, a first fastening member 723 and a first bearing 724. The first spool member 721 is roughly an H-shaped cylinder and is sleeved outside the first bearing 724. The first winding member 722 is wound around the outside of the first spool member 721. The first fastening member 723 extends outward from the first spool member 721 and is fixedly connected to one end of the second shaft 32 so that the first storage spool 72 can move synchronously with the second shaft 32. The first bearing 724 is fixedly connected to the other one of the first fixing members 74. The first connecting portion 73 is connected to the same side of the first winding body 713 and the first winding member 722. In other embodiments, as shown in FIG. 11, the first connecting portion 73 can also be connected to different sides of the first winding body 713 and the first winding member 722. The first fixing members 74 are fixed between one end of the upper cover 11 and one end of the lower cover 12.

The second constant torque spring 8 is similar to the first constant torque spring 7, constantly provides a second elastic force, and includes a second output spool 81, a second storage spool 82, a second connecting portion 83 and two second fixing members 84 (FIG. 13). The second output spool 81 has a second spool body 811, two second shaft bearings 812 and a second winding body 813. The second spool body 811 is roughly an H-shaped cylinder and is sleeved outside the second shaft bearings 812. One of the second shaft bearings 812 is inserted into the other end of the second shaft 32, and the other one of the second shaft bearings 812 is fixedly connected to one of the second fixing members 84, whereby the second spool body 811 can idly rotate relative to the second shaft 32. The second winding body 813 is wound around the outside of the second spool body 811. The second storage spool 82 has a second spool member 821, a second winding member 822, a second fastening member 823 and a second bearing 824. The second spool member 821 is roughly an H-shaped cylinder and is sleeved outside the second bearing 824. The second winding member 822 is wound around the outside of the second spool member 821. The second fastening member 823 extends outward from the second spool member 821 and is fixedly connected to the other end of the first shaft 31, so that the second storage spool 82 can move synchronously with the first shaft 31. The second bearing 824 is fixedly connected to the other one of the second fixing members 84.

Figure 12:
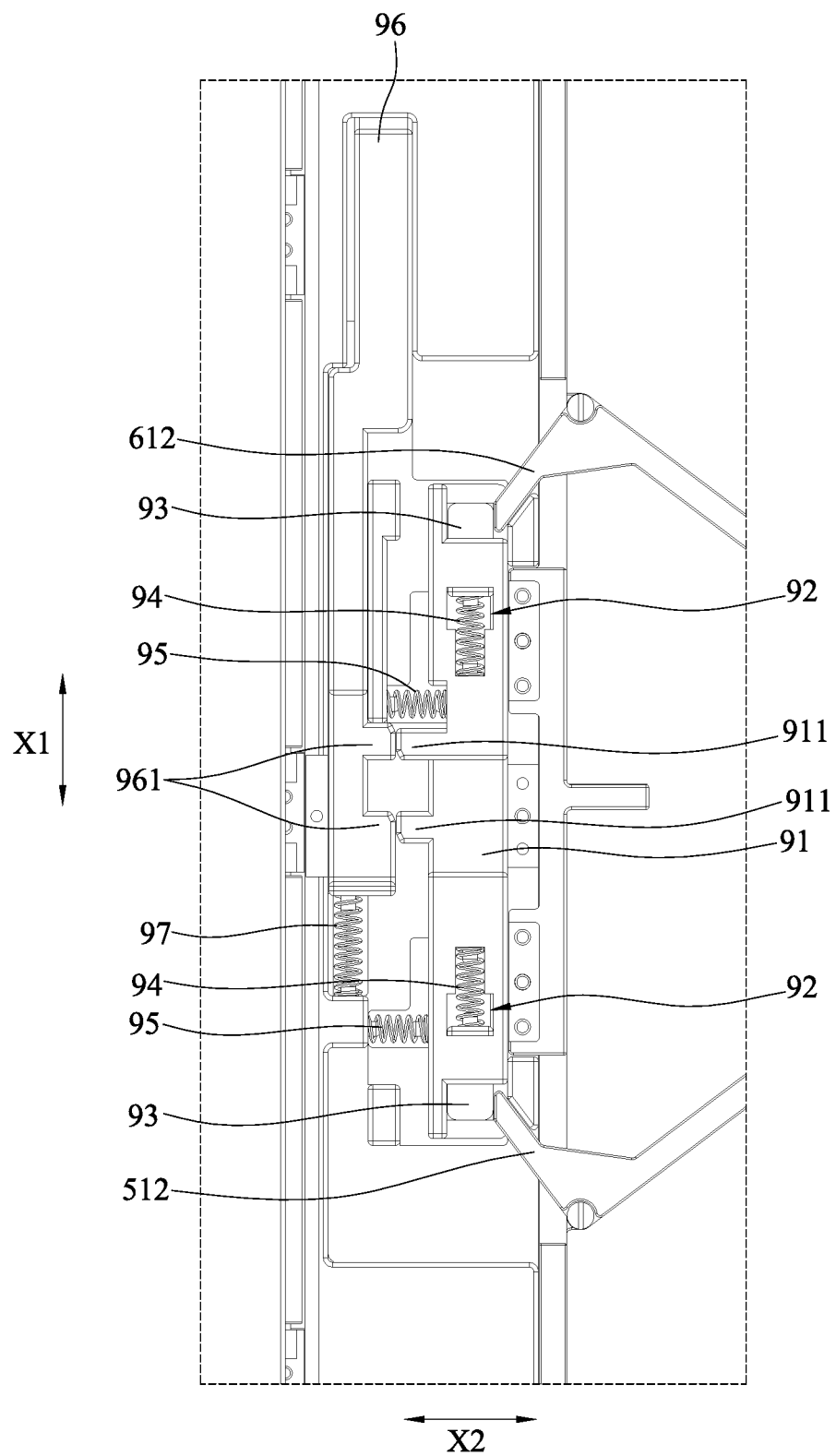
FIG. 12 is an overall schematic view of a switch module in the retractable display device according to the present disclosure.
Figure 14:
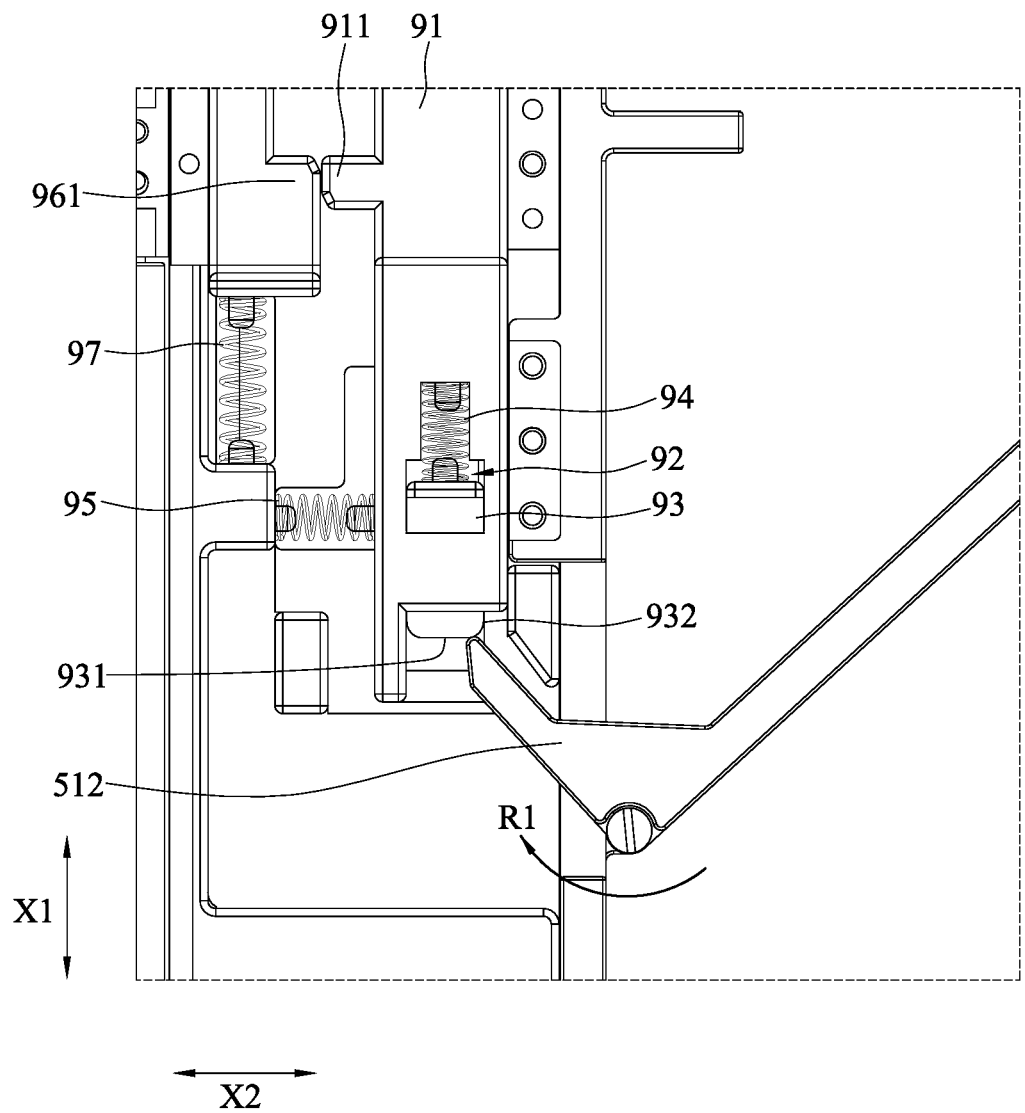
FIG. 14 to FIG. 17 are schematic views illustrating the actuation of the switch module in the retractable display device according to the present disclosure.

Please refer to FIG. 12 and FIG. 14 at the same time. The switch module 9 is provided on the extension plate 15 of the shaft housing 1 and includes a main block 91, two grooves 92, two stoppers 93, two first elastic members 94, two second elastic members 95, a sliding block 96 and a third elastic member 97. The main block 91 is roughly in the shape of a long strip, extending along the first axis X1, and has two protruding blocks 911 extending outward along the second axis X2. The grooves 92 are surrounded and defined by the main block 91 and are spaced apart from each other. The stoppers 93 are respectively provided in the grooves 92 and can move relative to the main block 91 along the first axis X1, and each of the stoppers 93 has a first surface 931 and a second surface 932 adjacent to the first surface 931. The first elastic members 94 are compression springs, which are respectively accommodated in the grooves 92 along the first axis X1, wherein two ends of each of the first elastic members 94 abut against the main block 91 and the stopper 93 respectively. The second elastic members 95 are compression springs, which are respectively provided between the main block 91 and the extension plate 15 along the second axis X2. The sliding block 96 is roughly in the shape of a long strip, is disposed on the extension plate 15 and can move relative to the extension plate 15 along the first axis X1, and has two protruding portions 961 extending outward along the second axis X2. The third elastic member 97 is a compression spring and is provided between the sliding block 96 and the extension plate 15 along the first axis X1.

Please refer to FIG. 2 and FIG. 13 at the same time. The telescopic track units A are respectively located on opposite sides of the plate housing 2 along the first axis X1, wherein two ends of each of the telescopic track units A are fixedly connected to the lower cover 12 and the tail plate 23 respectively, the telescopic track units A can be unfolded when the middle plate 22 extends out of the head plate 21 and the tail plate 23 extends out of the middle plate 22, and the telescopic track units A can be contracted when the middle plate 22 is retracted to the head plate 21 and the tail plate 23 is retracted to the middle plate 22. In one embodiment, the telescopic track unit A is a multi-section slide rail, and the slide rails of each section can slide against each other in the form of T-shaped bumps and guide rails matching the T-shaped bumps, but the present disclosure is not limited to as such. The magnetic components B are respectively provided on the upper surface of the telescopic track units A and in the accommodating portions 43 of the main support rods 4.

The flexible roller blind C is provided on the main support rods 4, the left connecting rod groups 5, the right connecting rod groups 6 and the telescopic track units A, wherein one end of the flexible roller blind C is wound around the first shaft 31 in a stretchable and retractable manner, and the other end of the flexible roller blind C is fixedly connected to the tail plate 23. In one embodiment, the flexible roller blind C is made of stainless steel and can be attracted by and attached on the magnetic components B. The flexible screen D is provided on the flexible roller blind C and includes a main display area D1, a retracting display area D2 and a connection area D3 that are connected in sequence. The main display area D1 is fixedly connected to the tail plate 23, and the connection area D3 is fixedly connected to the second shaft 32. It should be added that the flexible roller blind C is an additional element to fully support the flexible screen D. However, if the flexible roller blind C and the flexible screen D are rolled together on, for example, the first shaft 31, problems may arise when they are rolled together due to the accumulated thickness, and the shaft housing 1 may become an abrupt cylinder and cannot be flattened when the winding diameter in the retracted state is too large.

The following describes a transformation process of the retractable display device 1000 of the present disclosure between the retracted state (FIG. 13) and the extended state (FIG. 2). In the retracted state, the first elastic force of the first constant torque spring 7 and the second elastic force of the second constant torque spring 8 can tend to make the tail plate 23 be located in the middle plate 22 and the middle plate 22 be located in the head plate 21 via the flexible screen D and the flexible roller blind C respectively. At this time, the retracting display area D2 is retracted in the first accommodation space 13 via the second shaft 32, and a part of the flexible roller blind C is also retracted in the first accommodation space 13 via the first shaft 31. Each of the first left rods 51 and each of the second left rods 52, each of the third left rods 53 and each of the fourth left rods 54 are adjacent to each other and substantially parallel to each of the main support rods 4 and each of the fifth left rods 55, and each of the first right rods 61 and each of the second right rods 62, each of the third right rods 63 and each of the fourth right rods 64 are adjacent to each other and substantially parallel to each of the main support rods 4 and each of the fifth right rods 65. At this time, the lever portion 512 and the lever portion 612 are respectively away from the stoppers 93.

When an external force is applied to cause the tail plate 23 to move outward along the first axis X1, the tail plate 23 extends from the middle plate 22, the middle plate 22 extends from the head plate 21 and the retracted state is changed to the extended state, the retracting display area D2 is gradually exposed from the shaft housing 1, the flexible roller blind C rolled up on the first shaft 31 is also gradually exposed from the shaft housing 1, and the telescopic track units A are unfolded and together with the main support rods 4, the left connecting rod groups 5 and the right connecting rod groups 6, support the flexible roller blind C and the flexible screen D. At this time, one end of the first shaft 31 is idling relative to the first output spool 71 due to the first shaft bearing 712, but the other end of the first shaft 31 moves the second storage spool 82 simultaneously to wind the second winding member 822, and the second winding body 813 is gradually released. Similarly, one end of the second shaft 32 is idling relative to the second output spool 81 due to the second shaft bearing 812, but the other end of the second shaft 32 moves the first storage spool 72 simultaneously to wind the first winding body 713, and the first winding member 722 is gradually released.

As shown in FIG. 6, each of the first left rods 51 and each of the second left rods 52 reverse synchronously, and each of the third left rods 53 and each of the fourth left rods 54 reverse synchronously, so that each of the first left rods 51 and each of the second left rods 52, each of the third left rods 53 and each of the fourth left rods 54 are obliquely intersecting with each of the main support rods 4 and each of the fifth left rods 55, each of the third left rods 53 and each of the first left rods 51 are parallel to each other, and each of the fourth left rods 54 and each of the second left rods 52 are parallel to each other. Similarly, each of the first right rods 61 and each of the second right rods 62 reverse synchronously, and each of the third right rods 63 and each of the fourth right rods 64 reverse synchronously, so that each of the first right rods 61 and each of the second right rods 62, each of the third right rods 63 and each of the fourth right rods 64 are obliquely intersecting with each of the main support rods 4 and each of the fifth right rods 65, each of the third right rods 63 and each of the first right rods 61 are parallel to each other, and each of the fourth right rods 64 and each of the second right rods 62 are parallel to each other.

Figure 15:
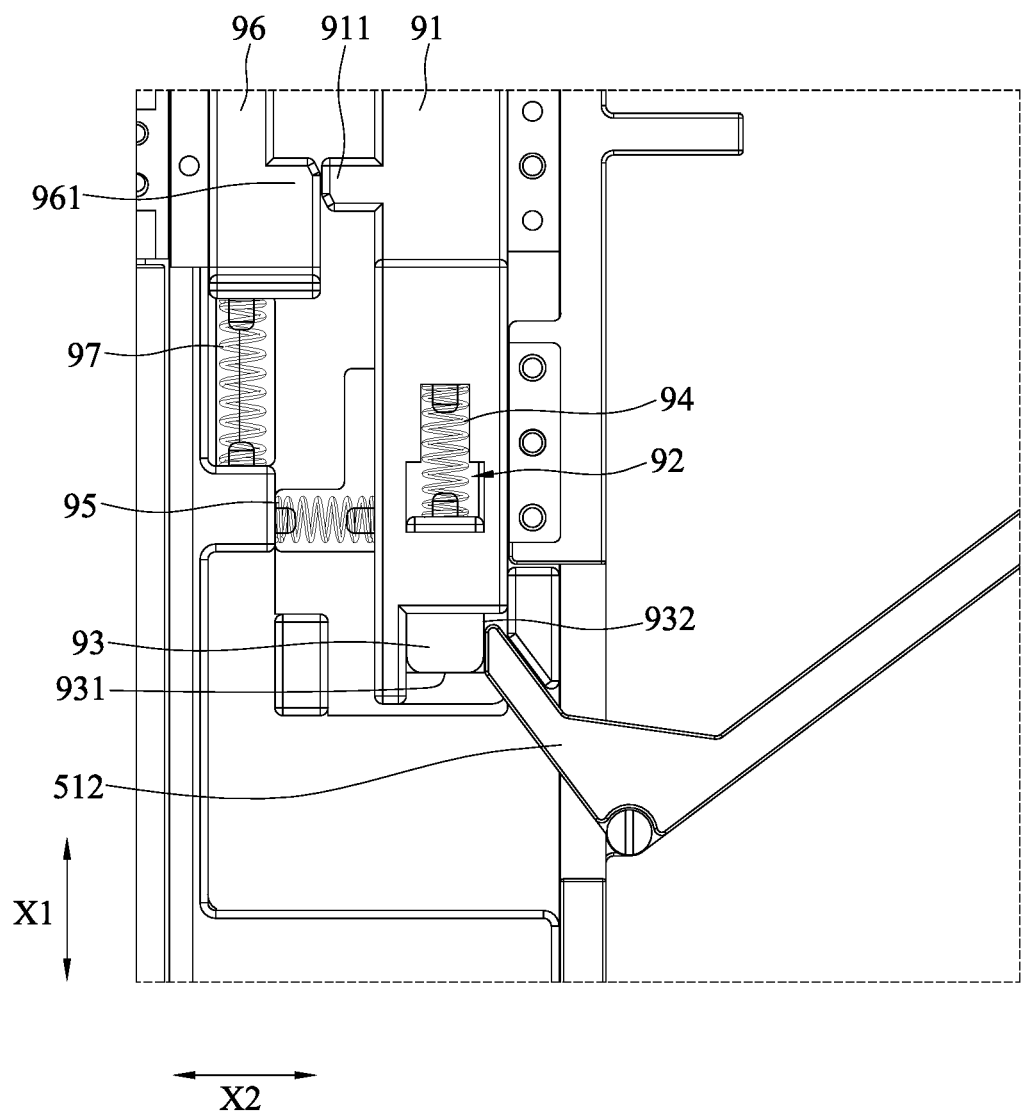

As shown in FIG. 14 (for convenience of illustration, only a part of the first left rod 51 is shown, the actuation principle of the first right rod 61 is the same as that of the first left rod 51 and will not be described again), the first left rod 51 closest to the mandrel module 3 rotates along a first rotation direction R1 (the first right rod 61 rotates in the direction opposite to the first rotation direction R1, not shown), so that the lever portion 512 abuts against the first surface 931 of the stopper 93 and pushes the stopper 93 along the first axis X1 to compress the first elastic member 94 until the lever portion 512 is separated from the first surface 931. As shown in FIG. 15, when the lever portion 512 is separated from the first surface 931, the first elastic member 94 rebounds to reset the stopper 93, so that the lever portion 512 abuts against the second surface 932 and is limited by the stopper 93. At this time, the plate housing 2 is always limited in an extended state, and the protruding blocks 911 abut against the protruding portions 961.

Figure 16:
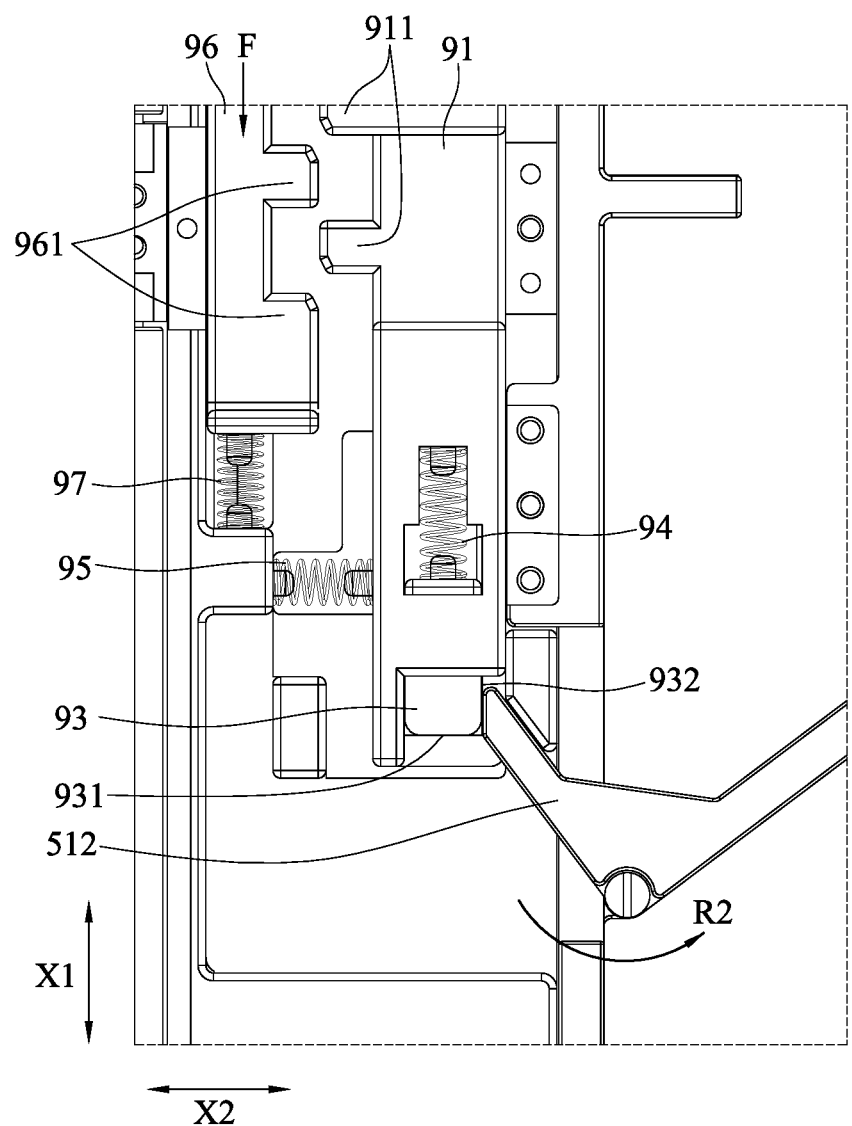
Figure 17:
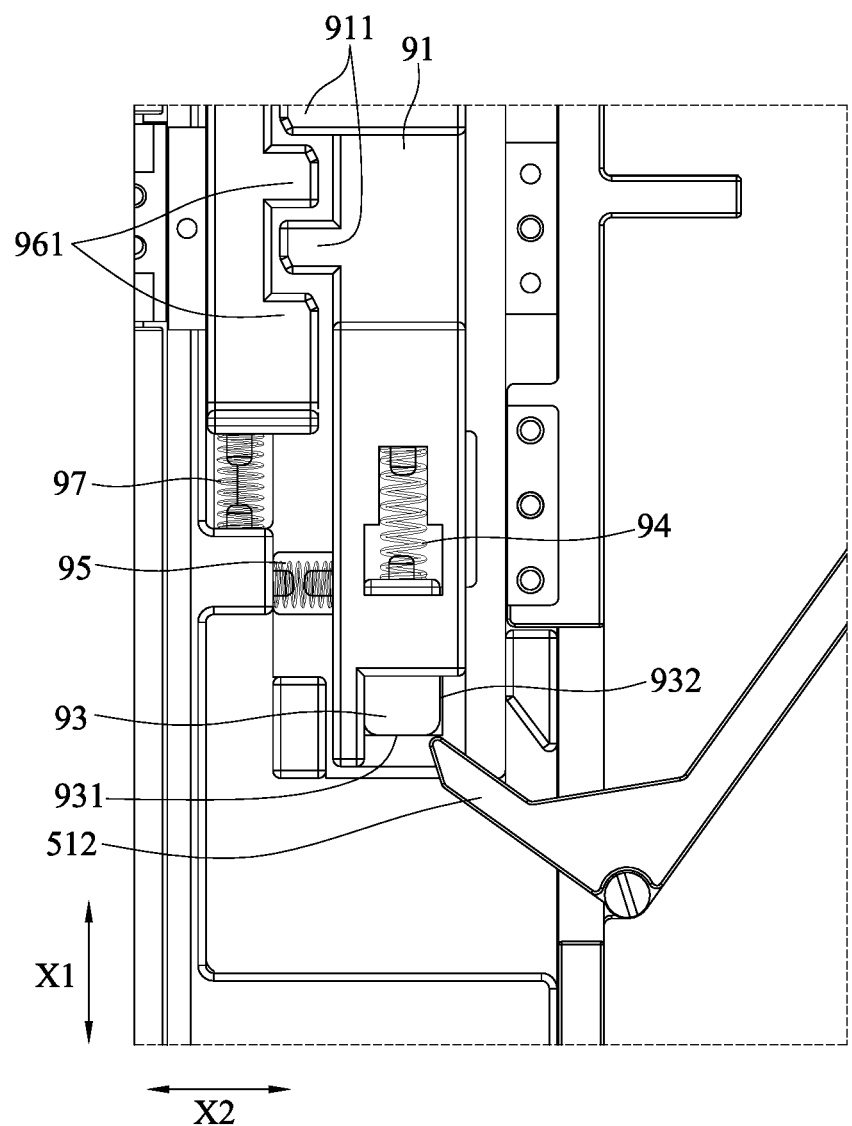

To change the plate housing 2 from the extended state to the retracted state, as shown in FIG. 16, an external force F is first applied to move the sliding block 96 along the first axis X1 and compress the third elastic member 97, so that the protruding portions 961 and the protruding blocks 911 are misaligned with each other. At this time, the main block 91 can move along the second axis X2. Then the tail plate 23 is pushed to be retracted to the middle plate 22, and the middle plate 22 is retracted to the head plate 21. At this time, the first elastic force and the second elastic force drive the first storage spool 72 and the second storage spool 82 respectively, so that the first winding body 713 is released and winds the first winding member 722, and the second winding member 822 is released and winds the second winding body 813. Thereby, the retracting display area D2 is gradually retracted into the first accommodation space 13 via the second shaft 32, and a part of the flexible roller blind C is also gradually retracted into the first accommodation space 13 via the first shaft 31, so that the telescopic track units A retract. Each of the first left rods 51 and each of the second left rods 52 reverse synchronously, and each of the third left rods 53 and each of the fourth left rods 54 reverse synchronously until they are adjacent to each other and substantially parallel to each of the main support rods 4 and each of the fifth left rods 55. Similarly, each of the first right rods 61 and each of the second right rods 62 reverse synchronously, and each of the third right rods 63 and each of the fourth right rods 64 reverse synchronously until they are adjacent to each other and substantially parallel to each of the main support rods 4 and each of the fifth right rods 65. At this time, the first left rod 51 closest to the mandrel module 3 rotates along a second rotation direction R2, so that the lever portion 512 abuts against the second surface 932 and pushes the main block 91 to move along the second axis X2 via the stopper 93 and compresses the second elastic member 95. As shown in FIG. 17, when the main block 91 moves to a position where the main block 91 and the protruding portions 961 are matched and locked with each other, the lever portion 512 is separated from the second surface 932 of the stopper 93, and the second elastic member 95 rebounds to reset the main block 91. At this time, when the external force F is removed, the third elastic member 97 rebounds to reset the sliding block 96, and the protruding portions 961 abut against the protruding blocks 911.

The above embodiment takes four left connecting rod groups 5 and four right connecting rod groups 6 as an example, but the present disclosure is not limited to as such. The number of the left connecting rod groups 5 and the number of the right connecting rod groups 6 can be increased or decreased according to design requirements. In addition, according to the design requirements, the left connecting rod groups 5 can also be omitted and only the right connecting rod groups 6 are retained (and vice versa). Similarly, the number of the telescopic track units A and the number of the magnetic components B can also be increased or decreased according to design requirements, as long as there is at least one telescopic track unit A disposed on one side of the flexible screen D, and the magnetic components B are sufficient to attract and attach the flexible roller blind C or the flexible screen D.

In other embodiments, the switch module 9 can also omit the sliding block 96 and the third elastic member 97, and only rely on the second elastic member 95 to control the movement and reset of the main block 91 along the second axis X2. That is to say, the user directly pulls the tail plate 23 outward or presses the tail plate 23 inward to change between the extended state and the retracted state, so that there is no need to move the sliding block 96 to retract or unfold the plate housing 2 and the flexible screen D directly.

To sum up, in the retractable display device of the present disclosure, via the arrangement of the first and second shafts with different axes and the first and second constant torque springs, it can achieve the function in that when the first shaft and the second shaft rotate forward/reversely, the first constant torque spring and the second constant torque spring can be respectively wound at one end of the first shaft and the second shaft, and the first constant torque spring and the second constant torque spring can be released at the other end of the first shaft and the second shaft, so as to effectively provide constant torque. In addition, the main support rods, the left connecting rod groups and the right connecting rod groups can be opened and closed synchronously, so that the opening and closing angles are consistent and can be stretched evenly and stably, effectively supporting the flexible screen, so as to have the advantages of small storage space and large expansion support surface.

What is claimed is:
1. A retractable display device, comprising:
   a shaft housing extending along a first axis and including a first accommodation space and an elongated opening intercommunicating with the first accommodation space;
   a plate housing assembled with the shaft housing and including a head plate, a tail plate and a semi-open second accommodation space, wherein the plate housing is able to expand and contract in and out along a second axis that is substantially perpendicular to the first axis, and the plate housing is able to change between a retracted state and an extended state;

a mandrel module located in the first accommodation space and including a first shaft and a second shaft extending along the first axis and spaced apart from each other;

a flexible roller blind wound around the first shaft in a stretchable and retractable manner;

a plurality of main support rods disposed in the second accommodation space and spaced apart from each other, wherein each of the main support rods extends substantially parallel to the first axis;

a plurality of left connecting rod groups respectively arranged between corresponding two of the main support rods, and respectively including a first left rod and a second left rod, wherein each of the first left rods and each of the second left rods are respectively pivoted on the corresponding main support rods, and any two adjacent first left rod and second left rod mesh with each other;

a flexible screen wound around the second shaft in a stretchable and retractable manner, and including a main display area, a retracting display area and a connection area connected in sequence, wherein the main display area is fixedly connected to the tail plate, and the connection area is fixedly connected to the second shaft;

a first constant torque spring constantly providing a first elastic force and including a first output spool and a first storage spool, wherein the first output spool is provided on the first shaft, the first storage spool is provided on the second shaft, and the first elastic force tends to maintain the plate housing in the retracted state via the flexible screen; and a second constant torque spring constantly providing a second elastic force and including a second output spool and a second storage spool, wherein the second output spool is provided on the second shaft, the second storage spool is provided on the first shaft, and the second elastic force tends to maintain the plate housing in the retracted state via the flexible roller blind;

wherein when in the retracted state, each of the first left rods and each of the second left rods are adjacent to each other and substantially parallel to each of the main support rods, the tail plate is located in the head plate, and the retracting display area is retracted in the first accommodation space via the mandrel module, and wherein when in the extended state, each of the first left rods and each of the second left rods are obliquely intersecting with the corresponding main support rods respectively, the tail plate extends from the head plate, and the retracting display area is exposed from the shaft housing.

2. The retractable display device of claim 1, wherein the first storage spool is fixedly connected to one end of the second shaft and rotates synchronously with the second shaft, and the second storage spool is fixedly connected to one end of the first shaft and rotates synchronously with the first shaft.

3. The retractable display device of claim 2, wherein the first output spool has a first spool body and a first shaft bearing, and the second output spool has a second spool body and a second shaft bearing, wherein the first spool body is sleeved outside the first shaft bearing, and the first shaft is inserted into the first shaft bearing, whereby the first spool body is able to idly rotate relative to the first shaft, and wherein the second spool body is sleeved outside the second shaft bearing, and the second shaft is inserted into the second shaft bearing, whereby the second spool body is able to idly rotate relative to the second shaft.

4. The retractable display device of claim 3, wherein each of the left connecting rod groups further includes a third left rod and a fourth left rod, each of the third left rods and each of the fourth left rods are respectively pivoted on the main support rod, and any two adjacent third left rod and fourth left rod mesh with each other, wherein when in the retracted state, each of the third left rods and each of the fourth left rods are adjacent to each other and parallel to each of the main support rods, and wherein when in the extended state, each of the third left rods and each of the fourth left rods are obliquely intersecting with each of the main support rods, each of the third left rods and each of the first left rods are parallel to each other, and each of the fourth left rods and each of the second left rods are parallel to each other.

5. The retractable display device of claim 4, wherein each of the left connecting rod groups further includes a fifth left rod, one end of the fifth left rod is for corresponding two adjacent first left rod and second left rod to be respectively pivoted on, and the other end of the fifth left rod is for corresponding two adjacent third left rod and fourth left rod to be respectively pivoted on, so that each of the fifth left rods is substantially parallel to each of the main support rods, whereby the main support rods, the first left rods, the second left rods, the third left rods, the fourth left rods and the fifth left rods together constitute a plurality of parallelograms connected to each other.

6. The retractable display device of claim 5, further comprising a switch module located in the shaft housing and capable of constantly limiting the plate housing to the extended state.

7. The retractable display device of claim 6, wherein the switch module includes a main block, at least one groove, at least one stopper and at least one first elastic member, and wherein the groove is surrounded and defined by the main block, the stopper is disposed in the groove and is able to move along the first axis relative to the main block, and the first elastic member is accommodated in the groove and abuts against the main block and the stopper.

8. The retractable display device of claim 7, wherein the stopper has a first surface and a second surface adjacent to the first surface, wherein the first left rod closest to the mandrel module has a lever portion, and the lever portion is pivotally connected to the main support rod adjacent to the mandrel module, and wherein when the plate housing changes from the retracted state to the extended state, the lever portion abuts against the first surface and pushes the stopper along the first axis and compresses the first elastic member, till the lever portion is separated from the first surface, and the first elastic member rebounds to reset the stopper, thereby causing the lever portion to abut against the second surface and be limited by the second surface.

9. The retractable display device of claim 8, wherein the switch module further includes at least one second elastic member, and the second elastic member is provided between the main block and the shaft housing, wherein when the plate housing changes from the extended state to the retracted state, the lever portion pushes the main block along the second axis via the second surface and compresses the second elastic member, till the lever portion is separated from the second surface, and the second elastic member rebounds to reset the main block.

10. The retractable display device of claim 9, wherein the switch module further includes a sliding block and a third elastic member, the sliding block has two protruding portions, the third elastic member is provided between the sliding block and the shaft housing, and the main block has two protruding blocks, wherein the main block is not able to move along the second axis when the protruding portions abut against the protruding blocks, and the main block is able to move along the second axis when the sliding block moves along the first axis and compresses the third elastic member so that the protruding portions and the protruding blocks are misaligned relatively, and wherein the third elastic member rebounds to cause the protruding portions to abut against the protruding blocks when the main block is reset via the second elastic member.

11. The retractable display device of claim 10, wherein the plate housing further includes at least one middle plate located between the head plate and the tail plate, wherein when in the retracted state, the middle plate is located in the head plate, and the tail plate is located in the middle plate, so the second accommodation space is surrounded and defined by the tail plate at this time, wherein when in the extended state, the middle plate extends from the head plate, and the tail plate extends from the middle plate, so the head plate, the middle plate and the tail plate collectively surround and define the second accommodation space at this time.

12. The retractable display device of claim 1, further comprising a plurality of right connecting rod groups respectively arranged between any two main support rods and spaced apart from the left connecting rod groups, wherein each of the right connecting rod groups includes a first right rod and a second right rod, each of the first right rods and each of the second right rods are respectively pivoted on the main support rod, and any two adjacent first right rod and second right rod mesh with each other, wherein when in the retracted state, each of the first right rods and each of the second right rods are adjacent to each other and parallel to each of the main support rods, and wherein when in the extended state, each of the first right rods and each of the second right rods are obliquely intersecting with each of the main support rods.

13. The retractable display device of claim 12, wherein each of the right connecting rod groups further includes a third right rod and a fourth right rod, each of the third right rods and each of the fourth right rods are respectively pivoted on the main support rod, and any two adjacent third right rod and fourth right rod mesh with each other, wherein when in the retracted state, each of the third right rods and each of the fourth right rods are adjacent to each other and parallel to each of the main support rods, and wherein when in the extended state, each of the third right rods and each of the fourth right rods are obliquely intersecting with each of the main support rods, each of the third right rods and each of the first right rods are parallel to each other, and each of the fourth right rods and each of the second right rods are parallel to each other.

14. The retractable display device of claim 13, wherein each of the right connecting rod groups further includes a fifth right rod, one end of the fifth right rod is for corresponding two adjacent first right rod and second right rod to be respectively pivoted on, and the other end of the fifth right rod is for corresponding two adjacent third right rod and fourth right rod to be respectively pivoted on, so that each of the fifth right rods is substantially parallel to each of the main support rods, whereby the main support rods, the first right rods, the second right rods, the third right rods, the fourth right rods and the fifth right rods together constitute a plurality of parallelograms connected to each other.

15. The retractable display device of claim 14, wherein the first constant torque spring further includes a first connecting portion, and the second constant torque spring further includes a second connecting portion, and wherein the first connecting portion is connected to the same side or different sides of the first output spool and the first storage spool, and the second connecting portion is connected to the same side or different sides of the second output spool and the second storage spool.

16. The retractable display device of claim 15, wherein a tooth portion is respectively provided at opposite ends of any two adjacent first left rod and second left rod, at opposite ends of any two adjacent third left rod and fourth left rod, at opposite ends of any two adjacent first right rod and second right rod, and at opposite ends of any two adjacent third right rod and fourth right rod, so that the first left rod and the second left rod, the third left rod and the fourth left rod, the first right rod and the second right rod, the third right rod and the fourth right rod are able to mesh with each other via the corresponding tooth portions, and are able to reverse synchronously when changing between the retracted state and the extended state.

17. The retractable display device of claim 16, further comprising at least one telescopic track unit disposed on the plate housing and correspondingly located on one side of the flexible screen, wherein when in the extended state, the telescopic track unit is unfolded and supports the flexible roller blind and the flexible screen together with the main support rods, the left connecting rod groups and the right connecting rod groups.

18. The retractable display device of claim 17, further comprising a plurality of magnetic components provided on the telescopic track unit and the main support rods for magnetically attracting and attaching the flexible screen or the flexible roller blind.

* * * * *